L. D. DOZIER.
TRAVELER'S COMBINED COLLAR AND CUFF CASE.
No. 11,421. Reissued June 5, 1894.
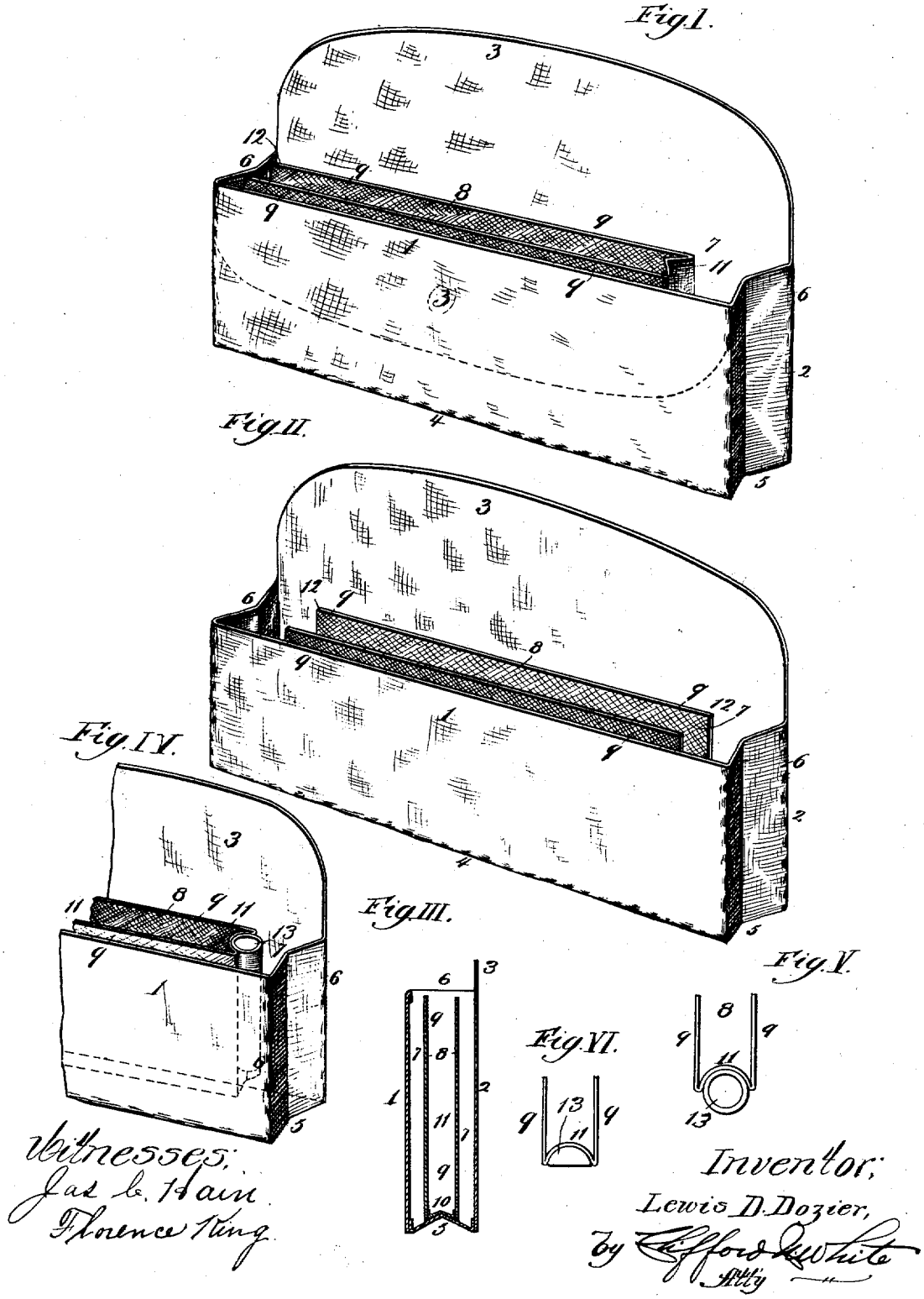
THE NATIONAL LITHOGRAPHING COMPANY,
WASHINGTON, D. C.

UNITED STATES PATENT OFFICE.

LEWIS D. DOZIER, OF ST. LOUIS, MISSOURI, ASSIGNOR TO THE TRAVELER'S PORTFOLIO COMPANY, OF MISSOURI.

TRAVELER'S COMBINED COLLAR AND CUFF CASE.

SPECIFICATION forming part of Reissued Letters Patent No. 11,421, dated June 5, 1894.

Original No. 470,553, dated March 8, 1892. Application for reissue filed March 31, 1894. Serial No. 505,962.

*To all whom it may concern:*

Be it known that I, LEWIS D. DOZIER, of the city of St. Louis, in the State of Missouri, have invented a certain new and useful Improvement in Travelers' Combined Collar and Cuff Cases, of which the following is a full, clear, and exact description, reference being had to the accompanying drawings, forming part of this specification.

My invention relates to a convenient receptacle for the use of travelers for preserving clean, laundered collars and cuffs and that also carries such as have been used without coming in contact with and soiling the clean ones, the same being in a form that can be conveniently packed in a traveler's valise with clothing, papers and other flat packages without disturbing their arrangement and taking but a minimum of room, unlike the usual collar and cuff boxes; and the invention consists of features of novelty hereinafter fully described, and pointed out in the claims.

Figure I is a perspective view of one of my cases, the flap-lid being elevated ready for the reception of collars and cuffs. It also shows the folded expansive compartment inside of which the clean laundered cuffs are laid without rolling or folding, and outside of which, around its bellows hinge the clean laundered collars are folded, the unfolded end of said compartment being in close proximity to the bellows-hinge at that end of the case and the bellows-folded end of said compartment sufficiently removed from the reverse end to allow room for the folding of the collars. Fig. II is a perspective view of the same case and shows a modification of the compartment in which neither end of said compartment is bellows-hinged and both ends are remote from the ends of the case to provide folding room at each end thereof. Fig. III is an enlarged vertical detail section and shows the case with its bellows-hinged bottom and the bellows-hinged bottom of the compartment seated and attached to that of the case. Fig. IV is a detail perspective view of one end of my improved case, showing the outer case and its inner compartment and the cushion-roll seated against the end bellows-hinge of said inner compartment and the space around said inner compartment and within the outer case for the safe packing of collars. Fig. V is a detail top view of the portion of the inner compartment shown in Fig. IV and showing more clearly the preferred form of the safety roll for maintaining the shape of the bend of the collars and preventing creasing. Fig. VI is a view similar to Fig. V, but showing a modified form of safety-roll.

Referring to the drawings, 1 represents the front, 2 the back and 3 the folding top flap of the case 4. 5 represents its bellows-hinged bottom, and 6 its bellows-hinged ends, all of which parts are preferably made of leather, but may be of any other suitable material. The interior case has preferably a lining 7 of colored linen or other suitable fabric that will neither hold the dust nor soil the clean articles packed therein.

8 represents the interior expansive bellows-hinged compartment whose sides 9 may be of card-board, covered, as in the lining of the case, with colored linen or other suitable material, and whose bellows-hinged bottom 10 and bellows-hinged ends 11 may be of the same material as that of which the sides of said compartment are covered, but is preferably of some stronger material, the margins of whose bellows-folds are secured between the two-ply thickness of the sides of the compartment by the same adhesive that secures said double plies of said sides together. The bellows-hinged bottom of said compartment is adhesively secured preferably by rubber or other elastic cement to the bellows-hinged bottom of the case, so that said duplex bellows-hinges of the bottoms of both said case and compartment may freely fold and expand together and at the same time retain their connection.

It will be seen that in my preferred form (shown in Fig. I) the said inner compartment has one open end 12 which closely approaches one of the bellows ends of the case; but the other end of said compartment has the above described bellows hinged folding, and expansive attachment 11. The latter end is placed sufficiently remote from the bellows-hinged end of the case to allow ample room for the folding of all the collars packed in the case. While, as stated, I prefer said form of compartment, yet I do not confine myself thereto, for the compartment may be made as shown in the modified form in Fig. II, in which, although the bottom 10 has the same bellows-hinged junction of the sides and thus, as in Figs. I and II, conforms to the bellows-hinged bottom of the case to which it is cemented, yet the end of said compartment may be left open, as shown in Fig. II, and said ends be each sufficiently remote from the ends of the case to enable the folding of clean laundered collars around one end and soiled ones around the other. Otherwise both ends of said compartment may have closed bellows-hinged ends, thus duplicating the end 11 at the other end of the compartment, in which case also it is preferred to leave sufficient room in the case at each end of the partition for folding around clean collars at one end and the soiled ones at the other.

13 represents a safety-roll. (Shown in its preferred form in Figs. IV and V and in the modified form in Fig. VI.) This roll 13, which consists, preferably, of the tube of any suitable material which will hold its form, is secured against the outside of the bellows-hinged end 11 of the inner compartment 8 in any suitable manner, the circular form of the stiff roll pressing against the said material of the end 11 and conforming it thereto. The outer edge of the roll presents a curvilinear surface around which the collars are folded, and thus their perfect contour is preserved without creasing, whether the compartment is filled with cuffs or not. There will be one of these safety-rolls at each end of the inner compartment in the form of case shown in Fig. II, but at only one end in the form of case shown in Fig. I. The roll is made shorter than the depth of the inner compartment in the construction shown, so that it will not extend to the bottom and interfere with the collapsing of the hinged bottom of the outer case. In Fig. VI the safety-roll is semi-circular in cross section and operates in the same manner as in the preferred form. This roll is of especial benefit after there ceases to be any clean laundered cuffs left between the leaves of sides 9 of the compartment and still there are remaining clean laundered collars. The said roll is also a benefit and safeguard at all times to insure the preservation of the perfect rounded contour of the laundered collars. The said safety roll may be either a perfect tube or semi-tube, and may be constructed and lined of the same material as the compartment, as specified above, or they may be made of light, smooth wood or of rubber or any other suitable material.

It will be understood that the clean laundered cuffs will be placed compactly in layers without folding or rolling between the sides 9 of the compartment 8, while, as stated, the collars fold around the expanded bellows-hinged ends of said two-leaved compartment, the contour of the turn of said collars being still further preserved, as described, by the roll 13 around which they turn.

Now, the drum-shaped boxes in common use for holding laundered collars and cuffs may answer the purpose for household use; but the traveler has no use for them in his valise. Neither are said boxes, whether of drum or cubical form, of suitable form for package with the under-linen, papers, &c., that generally constitute the other contents of the valise, and all lying accommodatingly flat in folds together. The shape of the usual collar and cuff boxes altogether disagrees with the convenient and safe package of the other occupants of the valise. It will also be seen that when cuffs and collars have been used and, as is sometimes the case, not returned when soiled to the case, said bellows-hinged case contracts to a narrow compass and takes up a still smaller amount of room in the valise, whereas with the usual drum-shaped and cubical boxes there is no contraction, for they are always the same size, empty as full. To overcome this long experienced difficulty and to provide a safe deposit, and a convenient means of package, I have invented the above described traveler's combined collar and cuff case. When soiled cuffs or collars are replaced in the case, which still holds a contingent of clean laundered ones, it is preferred to place a leaflet of cardboard or paper between the respective clean and soiled contents of said case to preserve the purity of the clean ones.

I claim as my invention—

1. In a collar and cuff case the combination of the oblong case 4 and the compartment 8 within the case 4, one of the ends of the compartment being remote from the case, substantially as and for the purposes set forth.

2. In a collar and cuff case, the combination of the collapsible case 4 and the compartment 8, supported wholly within the case 4 and having its ends remote from the ends of the case, substantially as and for the purpose set forth.

3. In a collar and cuff case, the combination of the case 4, having its folding and expanding bottom and ends 5 and 6, and the compartment 8, supported wholly within the case 4 and composed of the two leaf sides 9 and the expansible bottom and ends 10 and 11, substantially as set forth.

4. In a collar and cuff case, the combination of the case 4, having the folding and expanding bottom and ends 5 and 6, and the expansible compartment 8, supported wholly within the case 4 and formed with expansible bottom and ends 10 and 11, said expansible bottom 10 being attached to the bottom 5 of the case for supporting the compartment 8, substantially as set forth.

5. In a collar and cuff case, the combination of the case 4, the compartment 8, supported wholly within the case 4, and the roll 13, attached to the end of the compartment 8 for preserving the contour of the folded collars, substantially as and for the purpose set forth.

6. In a collar and cuff case, the combination of the case 4, the compartment 8, supported wholly within the case 4 and provided with the expansible ends 11, and the safety-rolls 13, attached to the ends 11 for preserving the contour of the folded collars, substantially as set forth.

7. In a collar and cuff case, the combination of the collapsible case 4, the compartment 8, supported wholly within the case 4 and formed with expansible ends 11, and the tubular safety-roll 13, attached to one of the expansible ends 11 of the compartment 8, substantially as set forth.

8. In a collar and cuff case the combination with the outer case of a safety roll within the case and a partition extending longitudinally of the case from the safety roll, substantially as and for the purposes set forth.

9. In a collar and cuff case the combination with the outer case of a safety roll near each end thereof and a partition extending longitudinally of the case between said safety rolls, substantially as and for the purposes set forth.

10. In a collar and cuff case, the combination of an oblong compartment receiving clean laundered cuffs, and the safety-roll located adjacent to the end of the outer case and furnishing a support around which the collars can be turned for maintaining the shape of the bend of the collars and preventing creasing, substantially as specified.

LEWIS D. DOZIER.

Witnesses:
O. W. BOND,
W. C. KNAUS.